(12) United States Patent
Ermakov

(10) Patent No.: US 8,642,354 B2
(45) Date of Patent: Feb. 4, 2014

(54) FLUID PROCESSING DEVICE FOR OLIGONUCLEOTIDE SYNTHESIS AND ANALYSIS

(75) Inventor: Sergey Ermakov, Hayward, CA (US)

(73) Assignee: Applied Biosystems, LLC, Carlsbad, CA (US)

( * ) Notice: Subject to any disclaimer, the term of this patent is extended or adjusted under 35 U.S.C. 154(b) by 327 days.

(21) Appl. No.: 12/944,322

(22) Filed: Nov. 11, 2010

(65) Prior Publication Data

US 2011/0124524 A1 May 26, 2011

Related U.S. Application Data

(63) Continuation of application No. 11/092,180, filed on Mar. 29, 2005, now abandoned.

(51) Int. Cl.
*G01N 35/00* (2006.01)
(52) U.S. Cl.
USPC ................................. 436/180; 436/50; 436/55
(58) Field of Classification Search
USPC .................................................... 436/180, 45
See application file for complete search history.

(56) References Cited

U.S. PATENT DOCUMENTS

| | | | |
|---|---|---|---|
| 5,185,144 A | 2/1993 | Koslo et al. | |
| 5,378,841 A | 1/1995 | Summerton et al. | |
| 5,432,272 A | 7/1995 | Benner | |
| 5,470,967 A | 11/1995 | Huie et al. | |
| 5,698,685 A | 12/1997 | Summerton et al. | |
| 5,719,262 A | 2/1998 | Buchardt et al. | |
| 5,817,781 A | 10/1998 | Swaminathan et al. | |
| 5,846,396 A | 12/1998 | Zanzucchi et al. | |
| 6,043,060 A | 3/2000 | Imanishi | |
| 6,093,302 A | 7/2000 | Montgomery et al. | |
| 6,127,121 A | 10/2000 | Meyer et al. | |
| 6,143,877 A | 11/2000 | Meyer et al. | |
| 6,379,929 B1 | 4/2002 | Burns et al. | |
| 6,485,690 B1 | 11/2002 | Pfost | |
| 6,565,727 B1 | 5/2003 | Shenderov et al. | |
| 6,629,826 B2 | 10/2003 | Yoon et al. | |
| 6,660,845 B1 | 12/2003 | Gall et al. | |
| 6,670,461 B1 | 12/2003 | Wengel et al. | |
| 6,734,436 B2 | 5/2004 | Faris et al. | |
| 6,770,748 B2 | 8/2004 | Imanishi et al. | |
| 6,773,566 B2 | 8/2004 | Shenderov et al. | |
| 6,866,762 B2 | 3/2005 | Gascoyne et al. | |
| 6,893,547 B2 | 5/2005 | Gascoyne et al. | |
| 6,911,132 B2 | 6/2005 | Pamula et al. | |
| 6,943,034 B1 | 9/2005 | Winkler et al. | |
| 6,958,132 B2 | 10/2005 | Chiou et al. | |
| 2002/0043463 A1 | 4/2002 | Shenderov | |
| 2002/0114715 A1 | 8/2002 | Yoon et al. | |
| 2002/0137218 A1 * | 9/2002 | Mian et al. | 436/45 |
| 2002/0168671 A1 | 11/2002 | Burns et al. | |
| 2003/0006140 A1 | 1/2003 | Vacca et al. | |
| 2003/0054176 A1 | 3/2003 | Pantano et al. | |
| 2003/0070677 A1 | 4/2003 | Handique et al. | |
| 2003/0082081 A1 | 5/2003 | Fouillet et al. | |
| 2003/0138941 A1 | 7/2003 | Gong et al. | |
| 2003/0164295 A1 | 9/2003 | Sterling | |
| 2003/0205632 A1 | 11/2003 | Kim et al. | |
| 2003/0224528 A1 * | 12/2003 | Chiou et al. | 436/164 |
| 2004/0031688 A1 | 2/2004 | Shenderov | |
| 2004/0055536 A1 | 3/2004 | Kolar et al. | |
| 2004/0055891 A1 | 3/2004 | Pamula et al. | |
| 2004/0058450 A1 | 3/2004 | Pamula et al. | |
| 2004/0231987 A1 | 11/2004 | Sterling et al. | |
| 2005/0045238 A1 | 3/2005 | Yang et al. | |
| 2005/0166980 A1 | 8/2005 | Unger et al. | |

FOREIGN PATENT DOCUMENTS

| | | |
|---|---|---|
| EP | 1525916 | 4/2005 |
| WO | WO-01/04909 | 1/2001 |
| WO | WO-2005/100541 | 10/2005 |

* cited by examiner

*Primary Examiner* — Natalia Levkovich

(57) ABSTRACT

The present teachings provide a fluid processing device adapted to produce different oligomers in a plurality of respective reaction sites. The fluid processing device can comprise a first manifold for delivering reactants to the plurality of reaction sites, and a second manifold for removing waste from, and optionally delivering wash fluid to, the plurality of reaction sites. Surface tension control valves can be disposed in fluid communication with the first manifold and can selectively allow reactants and/or fluids into the reaction sites. A method of making oligonucleotides is also provided.

10 Claims, 7 Drawing Sheets

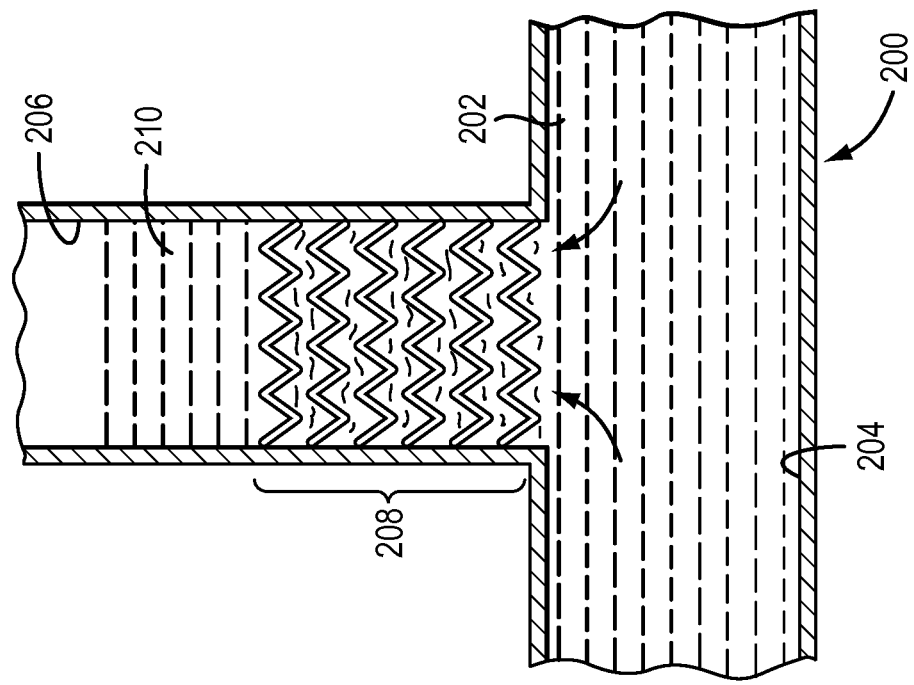
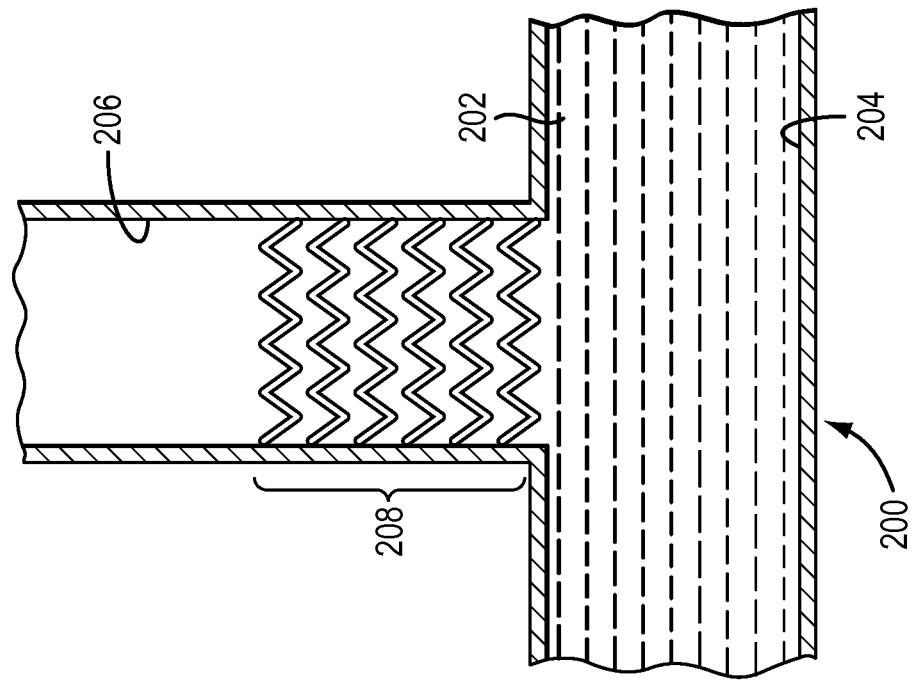

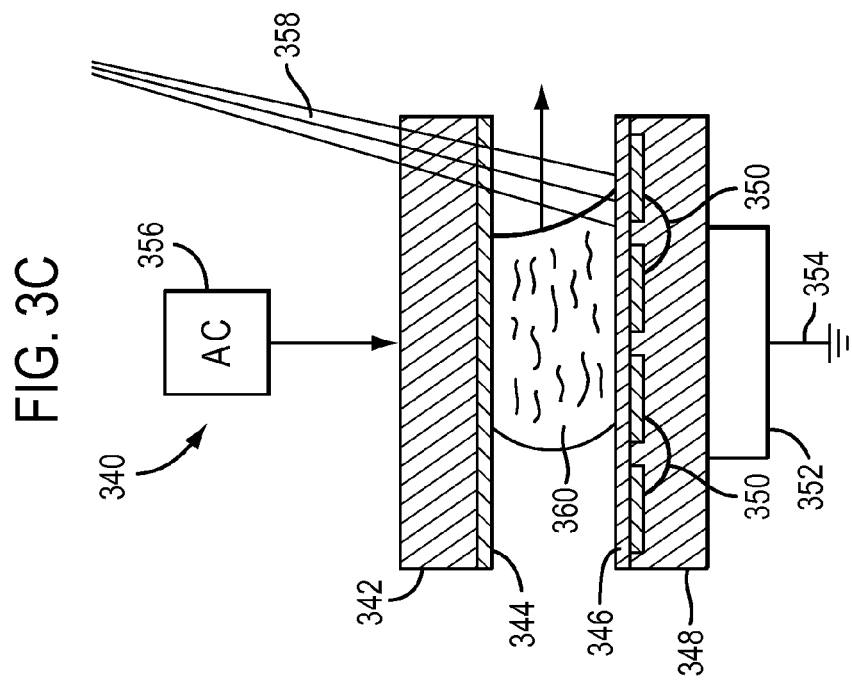
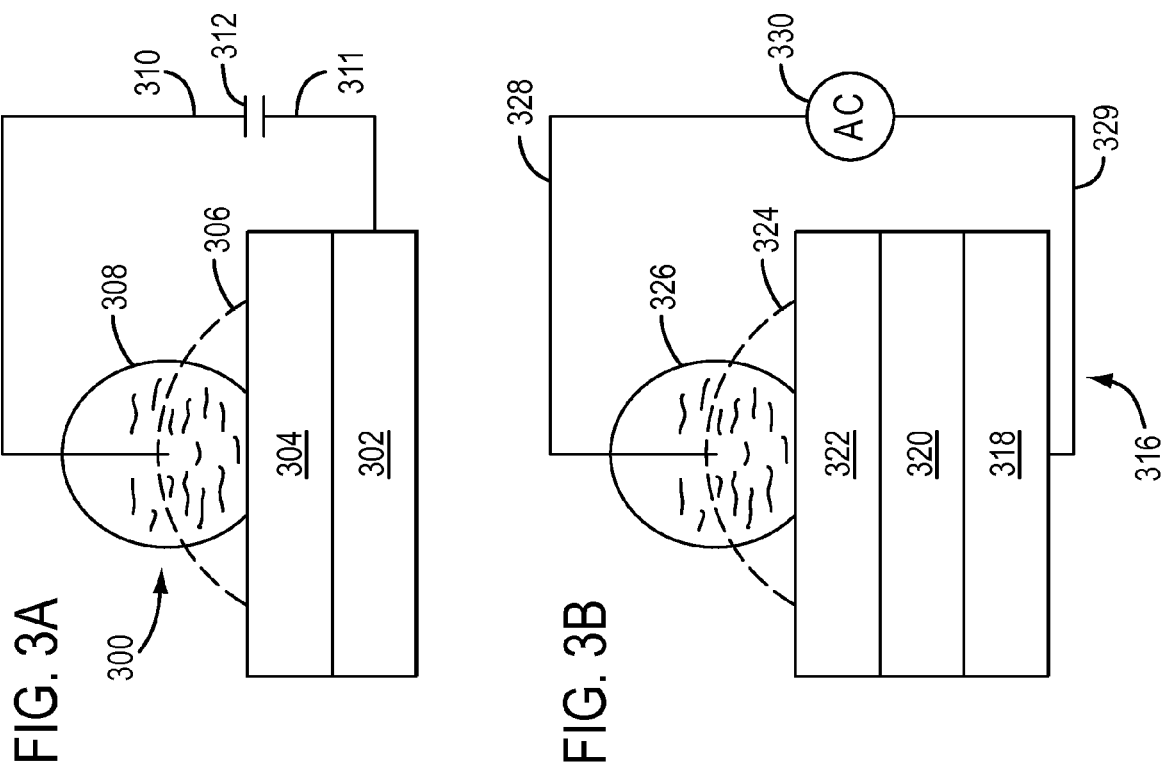

FLUID PROCESSING DEVICE FOR OLIGONUCLEOTIDE SYNTHESIS AND ANALYSIS

CROSS REFERENCE TO RELATED APPLICATION

This application is a continuation of application Ser. No. 11/092,180, filed May 29, 2005, which is incorporated herein by reference in its entirety.

FIELD

The present teachings relate to fluid processing devices and methods for using the same.

BACKGROUND

One of the challenges encountered in fluid processing devices, particularly devices designed for high throughput operations, is how to effectively control fluid flow. It is especially difficult to individually and independently control fluid flow in thousands of micro-channels without resorting to the fabrication of sophisticated valving systems which can make microfluidic devices very expensive. A device and method for controlling fluid flow in a microfluidic system is desirable.

SUMMARY

According to various embodiments, a fluid processing device is provided that includes a plurality of reaction sites, a first manifold in fluid communication with each of the reaction sites, a second manifold in fluid communication with each of the reaction sites, and at least one surface tension control valve positioned in at least one channel between the first manifold and at least one of the reaction sites. The reaction sites can each comprise support structures, for example beads, or an inner surface, suitable for the attachment of oligomers or oligomer precursors thereto. According to various embodiments, the fluid processing device can comprise a plurality of surface tension control valves each in fluid communication with the first manifold and one or more of the reaction sites.

According to various embodiments, the fluid processing device can comprise reactants and/or reaction components capable of producing an oligomer in at least one of the reaction sites, or a system that includes sources of reactants and/or reaction components.

According to various embodiments, a system is provided that can comprise a fluid processing device as described herein, and an electromagnetic radiation source capable of emitting electromagnetic radiation and directing the radiation toward one or more surface tension control valves in the device. Alternatively or additionally, the system can comprise other valve-actuating devices besides an electromagnetic radiation source. Exemplary actuators can comprise heaters adapted to direct heat toward one or more surface tension control valves, or an electrical source adapted to supply an electrical signal to one or more surface tension control valves. By controlling the one or more surface tension control valves, the systems described herein can be used in directing the flow of reaction components in an order useful for carrying out an oligonucleotide synthesis reaction within one or more of the plurality of reaction sites.

According to various embodiments, a system is provided that comprises an electromagnetic radiation source or other actuating source, a reflective device, a pump, and a thermocycler. The system can be adapted so that the reflective device can direct electromagnetic radiation emitted from the electromagnetic radiation source toward the one or more surface tension control valves to selectively open or close the respective one or more surface tension control valves. The pump can be adapted to add or remove materials from the channels and reaction sites. The thermocycler can be adapted to control the temperature of the reaction sites, for example, to promote an isothermal or thermally cycled nucleic acid sequence amplification and/or detection assay. The system can comprise one or more control units to control the actuating source, to control the reflective device, to control the pump, and/or to control the thermocycler.

According to various embodiments, a method is provided for synthesizing oligonucleotides or other chemical structures, from component building blocks. The method can comprise, for example, introducing a first monomer into a first fluid distribution manifold of a fluid processing device; opening at least one surface tension control valve in fluid communication with both the first fluid distribution manifold and at least one respective reaction site, to form an open surface tension control valve; moving the first monomer from the first manifold, through the at least one open surface tension control valve, and into the at least one respective reaction site; and attaching the first monomer to a first structure in the at least one respective reaction site to form an extended structure. The first monomer can be, for example, a nucleotide, a nucleotide base, a nucleotide analog, a protected chemical building block, or another monomeric building block, unit, or structure that can bond with and extend off of a support or precursor structure. The first monomer can be a protected first monomer, the extended structure can be a protected extended structure, and the method can further comprise: washing the at least one respective reaction site subsequent to the attaching; closing the at least one surface tension control valve; introducing a deprotecting agent into the first manifold; opening the at least one surface tension control valve to form at least one reopened surface tension control valve; moving the deprotecting agent from the first manifold, through the at least one reopened surface tension control valve, and into the at least one respective reaction site; and deprotecting the extended protected structure to form a deprotected extended structure. An additional monomer can then be added to the deprotected extended structure and the process can be repeated.

BRIEF DESCRIPTION OF THE DRAWINGS

Various embodiments of the present teachings are exemplified by the accompanying drawings. The teachings are not limited to the embodiments depicted, and include equivalent structures and methods as set forth in the following description and as would be known or recognized by those of ordinary skill in the art given the present teachings. In the drawings:

FIG. 2A is a cross-sectional view through a portion of a device according to various embodiments and including a surface tension control valve in a closed state;

FIG. 2B is the same cross-sectional view shown in FIG. 2A, but after the surface tension control valve has been opened;

FIG. 3A is a side view of a surface tension control valve showing in phantom the effect that actuation of a surface tension control device has on the shape of a drop of water;

FIG. 3B is a side view of a surface tension control device showing in phantom the effect that actuation of the device has on the shape of a drop of water;

FIG. 3C is a partial cross-sectional view of a surface tension control device showing the direction of movement of a drop of water, resulting from actuation of the valve;

Figure 1:
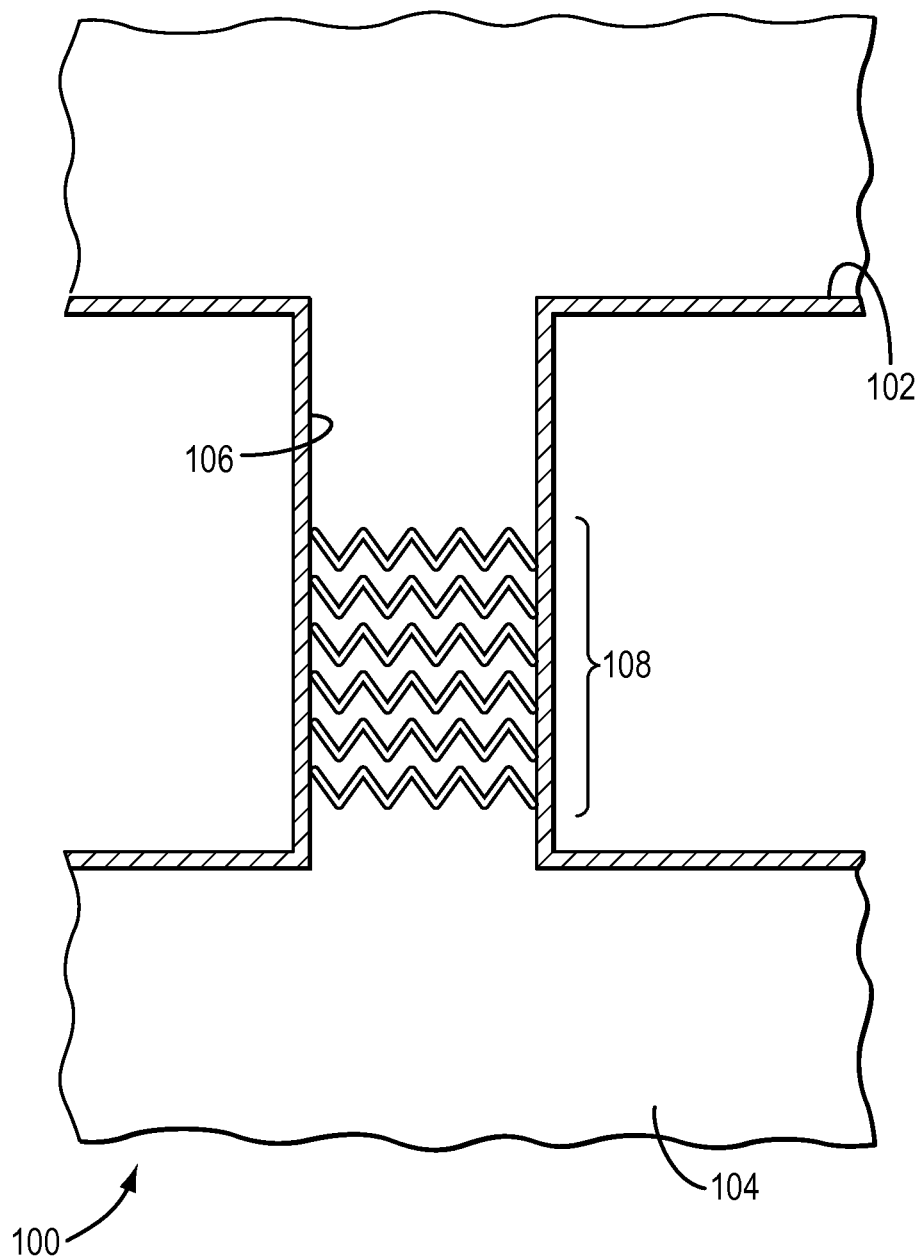
FIG. 1 is a cross-sectional view through a portion of a device according to various embodiments and including a surface tension control valve.
Figure 4A:
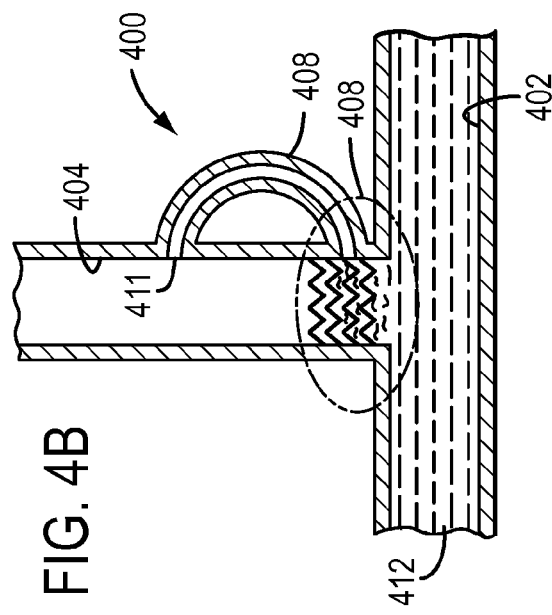
FIG. 4A is a cross-sectional view through a portion of a device according to various embodiments and showing a light-activated surface tension control valve in a closed state.
Figure 4B:
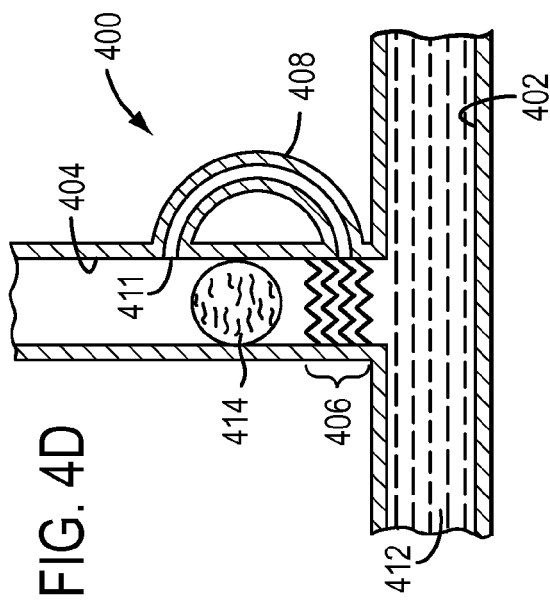
FIG. 4B is the same cross-sectional view as shown in FIG. 4A, but wherein the light-activated surface tension control valve is in an open state.
Figure 4C:
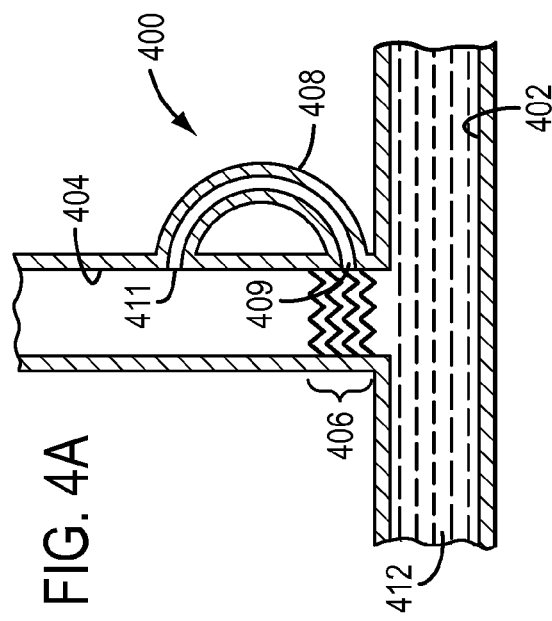
FIG. 4C is the same cross-sectional view as shown in FIG. 4A, but wherein the light-activated surface tension control valve is in an open state and liquid has passed through the valve.
Figure 4D:
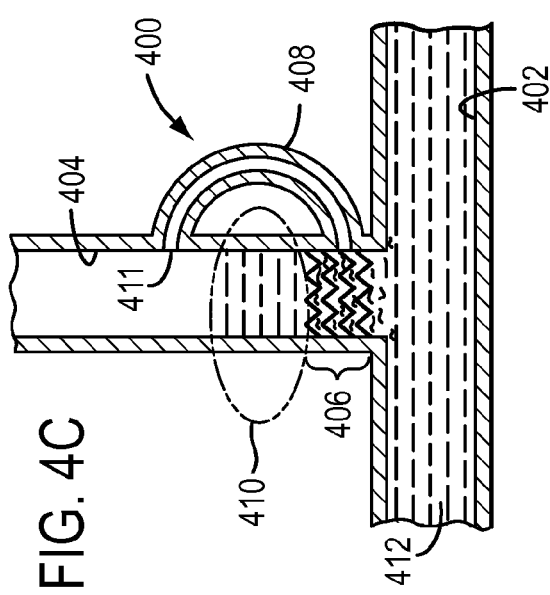
FIG. 4D is the same cross-sectional view as shown in FIG. 4A, but wherein the valve is in a closed state after liquid has passed through the valve.

It is to be understood that both the foregoing general description and the following detailed description are exemplary and explanatory only, and are intended to provide an explanation of various embodiments of the present teachings.

DETAILED DESCRIPTION OF EXEMPLARY EMBODIMENT

According to various embodiments, a fluid processing device is provided that can be used to manipulate the delivery of reactants or reaction components to a reaction site to enable the production of one or more compounds comprising multiple building blocks, for example, one or more desired oligomers or one or more desired oligonucleotides. Oligomers as defined herein can include polymers of amino acids, polymers of sugars, polymers of nucleotide bases, polymers of nucleotide analogs, and/or polymers of other nucleotide monomeric units herein referred to as nucleotides.

According to various embodiments, the device described herein can be useful in carrying out chemical compound synthesis methods using building blocks, exemplified herein with oligonucleotide synthesis methods. These methods can comprise, for example, various oligonucleotide extension reactions, protecting and/or deprotecting reactions, capping reactions, washing steps, cleaving reactions, and the like. Exemplary oligonucleotide synthesis reactions can include those described, for example, in U.S. patent application Ser. No. 10/891,650, filed Jul. 15, 2004, which is incorporated herein in its entirety by reference.

The term "nucleotide base", as used herein, refers to a substituted or unsubstituted aromatic ring or substituted or unsubstituted aromatic rings. In certain embodiments, the aromatic ring or rings contain at least one nitrogen atom. In certain embodiments, the nucleotide base is capable of forming Watson-Crick and/or Hoogsteen hydrogen bonds with an appropriately complementary nucleotide base. Exemplary nucleotide bases and analogs thereof include, but are not limited to, naturally occurring nucleotide bases, adenine, guanine, cytosine, 6 methyl-cytosine, uracil, thymine, and analogs of the naturally occurring nucleotide bases, e.g., 7-deazaadenine, 7-deazaguanine, 7-deaza-8-azaguanine, 7-deaza-8-azaadenine, N6-Δ2-isopentenyladenine (6iA), N6-Δ2-isopentenyl-2-methylthioadenine (2 ms6iA), N2-dimethylguanine (dmG), 7-methylguanine (7mG), inosine, nebularine, 2-aminopurine, 2-amino-6-chloropurine, 2,6-diaminopurine, hypoxanthine, pseudouridine, pseudocytosine, pseudoisocytosine, 5-propynylcytosine, isocytosine, isoguanine, 7-deazaguanine, 2-thiopyrimidine, 6-thioguanine, 4-thiothymine, 4-thiouracil, O6-methylguanine, N6-methyladenine, O4-methylthymine, 5,6-dihydrothymine, 5,6-dihydrouracil, pyrazolo[3,4-D]pyrimidines (see, e.g., U.S. Pat. Nos. 6,143,877 and 6,127,121 and PCT published application WO 01/38584), ethenoadenine, indoles such as nitroindole and 4-methylindole, and pyrroles such as nitropyrrole. Certain exemplary nucleotide bases can be found, e.g., in Fasman, 1989, Practical Handbook of Biochemistry and Molecular Biology, pp. 385-394, CRC Press, Boca Raton, Fla., and the references cited therein.

The term "nucleotide", as used herein, refers to a compound comprising a nucleotide base linked to the C-1' carbon of a sugar, such as ribose, arabinose, xylose, and pyranose, and sugar analogs thereof. The term nucleotide also encompasses nucleotide analogs. The sugar may be substituted or unsubstituted. Substituted ribose sugars include, but are not limited to, those riboses in which one or more of the carbon atoms, for example the 2'-carbon atom, is substituted with one or more of the same or different Cl, F, —R, —OR, —NR2 or halogen groups, where each R is independently H, C1-C6 alkyl, or C5-C14 aryl. Exemplary riboses include, but are not limited to, 2'-(C1-C6)alkoxyribose, 2'-(C5-C14)aryloxyribose, 2',3'-didehydroribose, 2'-deoxy-3'-haloribose, 2'-deoxy-3'-fluororibose, 2'-deoxy-3'-chlororibose, 2'-deoxy-3'-aminoribose, 2'-deoxy-3'-(C1-C6)alkylribose, 2'-deoxy-3'-(C1-C6)alkoxyribose and 2'-deoxy-3'-(C5-C14) aryloxyribose, ribose, 2'-deoxyribose, 2',3'-dideoxyribose, 2'-haloribose, 2'-fluororibose, 2'-chlororibose, and 2'-alkylribose, e.g., 2'-O-methyl, 4'-anomeric nucleotides, 1'-anomeric nucleotides, 2'-4'- and 3'-4'-linked and other "locked" or "LNA", bicyclic sugar modifications (see, e.g., PCT published application nos. WO 98/22489, WO 98/39352; and WO 99/14226). Exemplary LNA sugar analogs within a polynucleotide include, but are not limited to, the structures:

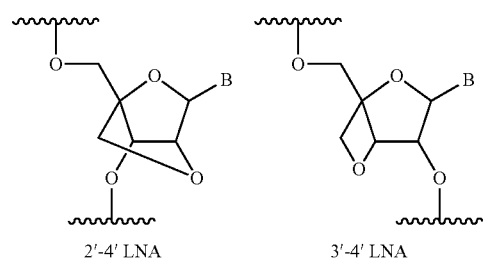

2'-4' LNA      3'-4' LNA where B is any nucleotide base.

Modifications at the 2'- or 3'-position of ribose include, but are not limited to, hydrogen, hydroxy, methoxy, ethoxy, allyloxy, isopropoxy, butoxy, isobutoxy, methoxyethyl, alkoxy, phenoxy, azido, amino, alkylamino, fluoro, chloro, and bromo. Nucleotides include, but are not limited to, the natural D optical isomer, as well as the L optical isomer forms (see, e.g., Garbesi (1993) Nucl. Acids Res. 21:4159-65; Fujimori (1990) J. Amer. Chem. Soc. 112:7435; Urata, (1993) Nucleic Acids Symposium Ser. No. 29:69-70). When the nucleotide base is purine, e.g. A or G, the ribose sugar is attached to the N9-position of the nucleotide base. When the nucleotide base is pyrimidine, e.g. C, T or U, the pentose sugar is attached to the N1-position of the nucleotide base, except for pseudouridines, in which the pentose sugar is attached to the C5 position of the uracil nucleotide base (see, e.g., Kornberg and Baker, (1992) *DNA Replication,* 2nd Ed., Freeman, San Francisco, Calif.).

One or more of the pentose carbons of a nucleotide may be substituted with a phosphate ester having the formula:

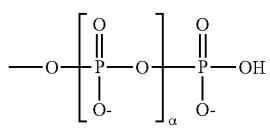

where α is an integer from 0 to 4. In certain embodiments, α is 2 and the phosphate ester is attached to the 3'- or 5'-carbon of the pentose. In certain embodiments, the nucleotides are those in which the nucleotide base is a purine, a 7-deazapurine, a pyrimidine, or an analog thereof. "Nucleotide 5'-triphosphate" refers to a nucleotide with a triphosphate ester group at the 5' position, and are sometimes denoted as "NTP", or "dNTP" and "ddNTP" to particularly point out the structural features of the ribose sugar. The triphosphate ester group may include sulfur substitutions for the various oxygens, e.g. -thio-nucleotide 5'-triphosphates. For a review of nucleotide chemistry, see: Shabarova, Z. and Bogdanov, A. *Advanced Organic Chemistry of Nucleic Acids*, VCH, New York, 1994.

The term "nucleotide analog", as used herein, refers to embodiments in which the pentose sugar and/or the nucleotide base and/or one or more of the phosphate esters of a nucleotide may be replaced with its respective analog. In certain embodiments, exemplary pentose sugar analogs are those described above. In certain embodiments, the nucleotide analogs have a nucleotide base analog as described above. In certain embodiments, exemplary phosphate ester analogs include, but are not limited to, alkylphosphonates, methylphosphonates, phosphoramidates, phosphotriesters, phosphorothioates, phosphorodithioates, phosphoroselenoates, phosphorodiselenoates, phosphoroanilothioates, phosphoroanilidates, phosphoroamidates, boronophosphates, and the like, and may include associated counterions.

Also included within the definition of "nucleotide analog" are nucleotide analog monomers that can be polymerized into polynucleotide analogs in which the DNA/RNA phosphate ester and/or sugar phosphate ester backbone is replaced with a different type of internucleotide linkage. Exemplary polynucleotide analogs include, but are not limited to, peptide nucleic acids, in which the sugar phosphate backbone of the polynucleotide is replaced by a peptide backbone. Also included are intercalating nucleic acids (INAs, as described in Christensen and Pedersen, 2002), and AEGIS bases (Eragen, U.S. Pat. No. 5,432,272).

As used herein, the terms "polynucleotide", "oligonucleotide", and "nucleic acid" are used interchangeably and mean single-stranded or double-stranded polymers of nucleotide monomers, including 2'-deoxyribonucleotides (DNA) and ribonucleotides (RNA) linked by internucleotide phosphodiester bond linkages, or internucleotide analogs, and associated counter ions, e.g., H+, NH4+, trialkylammonium, Mg2+, Na+ and the like. A nucleic acid can be composed entirely of deoxyribonucleotides, entirely of ribonucleotides, or chimeric mixtures thereof. The nucleotide monomer units can comprise any of the nucleotides described herein, including, but not limited to, naturally occurring nucleotides and nucleotide analogs. Nucleic acids typically range in size from a few monomeric units, e.g. 5-40 when they are sometimes referred to in the art as oligonucleotides, to several thousands of monomeric nucleotide units. Unless denoted otherwise, whenever a nucleic acid sequence is represented, it will be understood that the nucleotides are in 5' to 3' order from left to right and that "A" denotes deoxyadenosine or an analog thereof, "C" denotes deoxycytidine or an analog thereof, "G" denotes deoxyguanosine or an analog thereof, and "T" denotes thymidine or an analog thereof, unless otherwise noted.

Nucleic acids include, but are not limited to, genomic DNA, cDNA, hnRNA, mRNA, rRNA, tRNA, fragmented nucleic acid, nucleic acid obtained from subcellular organelles such as mitochondria or chloroplasts, and nucleic acid obtained from microorganisms or DNA or RNA viruses that may be present on or in a biological sample.

Nucleic acids may be composed of a single type of sugar moiety, e.g., as in the case of RNA and DNA, or mixtures of different sugar moieties, e.g., as in the case of RNA/DNA chimeras. In certain embodiments, nucleic acids are ribopolynucleotides and 2'-deoxyribopolynucleotides according to the structural formulae below:

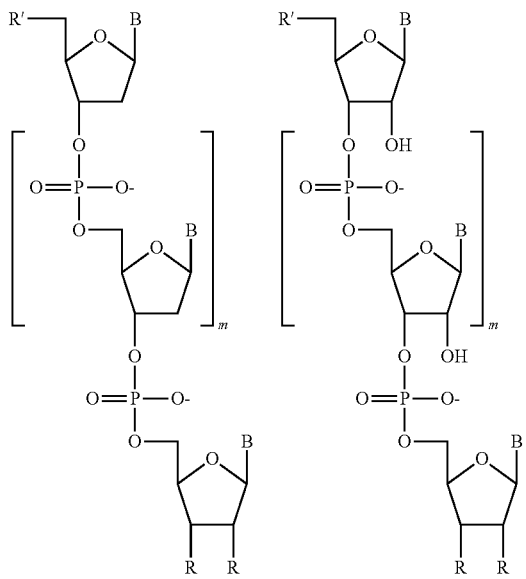

wherein each B is independently the base moiety of a nucleotide, e.g., a purine, a 7-deazapurine, a pyrimidine, or an analog nucleotide; each m defines the length of the respective nucleic acid and can range from zero to thousands, tens of thousands, or even more; each R is independently selected from the group comprising hydrogen, halogen, —R", —OR", and —NR"R", where each R" is independently (C1-C6) alkyl or (C5-C14) aryl, or two adjacent Rs are taken together to form a bond such that the ribose sugar is 2',3'-didehydroribose; and each R' is independently hydroxyl or

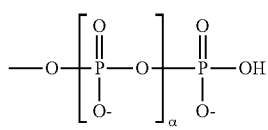

where α is zero, one or two.

In certain embodiments of the ribopolynucleotides and 2'-deoxyribopolynucleotides illustrated above, the nucleotide bases B are covalently attached to the C1' carbon of the sugar moiety as previously described.

The terms "nucleic acid", "polynucleotide", and "oligonucleotide" can also include nucleic acid analogs, polynucleotide analogs, and oligonucleotide analogs. The terms "nucleic acid analog", "polynucleotide analog" and "oligonucleotide analog" are used interchangeably and, as used herein, refer to a nucleic acid that contains at least one nucleotide analog and/or at least one phosphate ester analog and/or at least one pentose sugar analog. Also included within the definition of nucleic acid analogs are nucleic acids in which the phosphate ester and/or sugar phosphate ester linkages are replaced with other types of linkages, such as N-(2-aminoethyl)-glycine amides and other amides (see, e.g., Nielsen et al., 1991, Science 254: 1497-1500; WO 92/20702; U.S. Pat. Nos. 5,719,262; 5,698,685); morpholinos (see, e.g., U.S. Pat. Nos. 5,698,685; 5,378,841; 5,185,144); carbamates (see, e.g., Stirchak & Summerton, 1987, J. Org. Chem. 52: 4202); methylene(methylimino) (see, e.g., Vasseur et al., 1992, J. Am. Chem. Soc. 114: 4006); 3'-thioformacetals (see, e.g., Jones et al., 1993, J. Org. Chem. 58: 2983); sulfamates (see, e.g., U.S. Pat. No. 5,470,967); 2-aminoethylglycine, commonly referred to as PNA (see, e.g., Buchardt, WO 92/20702; Nielsen (1991) Science 254:1497-1500); and others (see, e.g., U.S. Pat. No. 5,817,781; Frier & Altman, 1997, Nucl. Acids Res. 25:4429 and the references cited therein). Phosphate ester analogs include, but are not limited to, (i) C1C4 alkylphosphonate, e.g. methylphosphonate; (ii) phosphoramidate; (iii) C1C6 alkyl-phosphotriester; (iv) phosphorothioate; and (v) phosphorodithioate.

The surface tension control valve that can be used according to various embodiments are herein exemplified by an implementation represented by a channel having an inner surface that is hydrophobic in the absence of illuminating radiation. According to various embodiments, the surface tension control valve can exploit the fact that under certain circumstances the contact angle for a liquid of interest, or its surface tension, changes and that change can in-turn trigger a movement of the liquid. Such circumstances can comprise an applied electric field (electrowetting), an applied electric field and light (optoelectrowetting), an applied local increase of temperature (thermo capillary effect), and the like. The liquid can be a liquid sample, for example, a biological sample in water or a biological sample in an aqueous medium. If the liquid is a biological sample, it can comprise, for example, any of the nucleotides, nucleotide bases, and/or nucleotide analogs described herein.

Exemplary surface tension control valves can comprise the microfluidic electrowetting control devices described in U.S. Patent Application Publication No. US 2004/0231987 A1, published Nov. 25, 2004; the electrostatic actuators for microfluidics described in U.S. Patent Application Publication No. US 2002/0043463 A1, published Apr. 18, 2002; the micropump device as described in U.S. Patent Application Publication No. US 2002/0114715 A1, published Aug. 22, 2002; the electrowetting microfluidic control device described in U.S. Patent Application Publication No. US 2003/0164295 A1, published Sep. 4, 2003; the control devices described in U.S. Patent Application Publication No. US 2002/0168671 A1, published Nov. 14, 2002; the optical microfluidic devices described in U.S. Patent Application Publication No. US 2003/0047688 A1; and the injecting devices as described in U.S. Patent Application Publication No. US 2003/0082081 A1; all of which are incorporated herein in their entireties by reference.

The present teachings are further exemplified herein with reference to the attached drawings. According to various embodiments, and as illustrated in FIG. 1, the fluid processing device 100 can comprise a surface tension control valve 108 disposed in a valve channel 106 that is in fluid communication with a supply channel 104 and a reaction region 102. In the embodiment shown, the surface tension control valve comprises a channel with an initially or normally hydrophobic surface. The surface tension control valve is adapted to change the contact angle and wetting of a liquid disposed therein with respect to the inner surface of the valve channel 106. This change can trigger the movement of a liquid through the valve channel 106. As discussed above, examples of the mechanism that can be used to trigger the movement can include the application of an electric field as with electrowetting, the application of an electric field and light as with optoelectrowetting, the application of a local increase in temperature, and the like.

According to various embodiments, and as illustrated in FIG. 2A, a portion of a fluid processing device is shown comprising a first conduit 204 separated from a second conduit 206 by a surface tension control valve 208. The pressure created by the surface tension in the surface tension control valve 208 can be sufficient to prevent a liquid 202, for example, an aqueous biological sample, from entering a second conduit 206. If the pressure difference across the surface tension control valve exceeds a certain threshold pressure, the resistance to the flow due to the hydrophobic properties of the valve can be overcome, and the liquid can flow through the valve. Likewise, if the pressure of the sample liquid is maintained below the threshold pressure, the valve will hold back the liquid sample and prevent flow into channel 206. According to various embodiments, by changing the surface tension of the valve from having a hydrophobic property to having a hydrophilic property, liquid movement through the valve can be regulated, even at pressure below the threshold pressure described above.

FIG. 2B illustrates the same device as shown in FIG. 2A but wherein the surface tension of the surface tension control valve 208 has been changed to be made hydrophilic, thus enabling liquid 210 to pass through the valve 208 and into the second conduit 206. Changing the surface tension of the valve can be accomplished by a variety of mechanism as described herein.

According to various embodiments, and as illustrated in FIG. 3A, the surface tension control valve can comprise a layered structure 300 capable of changing the surface tension of a surface. The layered structure 300 can comprise a first electrode-containing layer 302 positioned adjacent a second insulating layer 304. When the structure 300 is connected to a power source 312 through electrical leads 310 and 311, a change in surface tension can be effected by application of an electrical signal to the electrical leads 310 and 311. As a result of such a signal, the valve can change the overall shape of a liquid droplet from a first shape 308 having a greater contact angle, to a second shape 306 having a lesser contact angle, by creating a difference in electrical potential between the liquid and the electrode. By increasing or decreasing the power of the electrical signal, the shape of the droplet can be changed to take any of a variety of forms, as illustrated in FIGS. 3A and 3B.

According to various embodiments, and as illustrated in FIG. 3B, the fluid processing device can comprise a surface tension control valve that comprises a layered structure 316. The layered structure 316 can comprise a photoconductive layer 318, an electrode-containing layer 320, and an insulating layer 322. A power supply 330 can be connected through leads 328 and 329 to a liquid bead. Applying current will change the shape of the liquid droplet from the shape depicted in 326 to the shape depicted in 324. In other words, when illuminated by light, the photoconductive layer of the surface tension control valve can change locally and significantly in conductivity and, as a result, the surface of the insulating layer 322 that contacts the liquid droplet can be made hydrophilic or more hydrophilic. The contact angle or wetting of the liquid with respect to the surface can thus be changed and the liquid can accordingly be propagated in a certain direction.

According to various embodiments, and as illustrated in FIG. 3C, light beams 358 can change the electrical resistance of a photoconductive layer 348 in a light-activated valve 340, allowing electrical current to flow through one or more electrodes 350. Electrical current flow changes the surface tension of the liquid in parts of the liquid droplet 360 allowing liquid droplet 360 to flow toward the light beams 358.

According to various embodiments, and as illustrated in FIGS. 4A-4D, a fluid processing device 400 can comprise a first conduit 402 separated from a second conduit 404 by a light-activated surface tension control valve 406. When an area 410 including the valve 406 is illuminated by beams of light, the surface tension of the valve 406 changes and enables a liquid droplet 414 (FIG. 4D) to be separated from liquid 412 present in the first conduit 402. Conduit 408 can function to relieve air pressure differences caused by the movement of drop 414 into the second channel 404. Conduit 408 can include a first open end 409 in fluid communication with the interior of the valve 406, and a second open end 411 in fluid communication with the second conduit 404.

According to various embodiments and as depicted in FIGS. 4A-4D, a surface tension control valve separating a first liquid-containing conduit and a second conduit can normally or originally be in a closed state in the absence of illuminating radiation. If a light beam illuminates the surface tension control valve where the liquid contacts the valve, the valve surface can be made hydrophilic, enabling the liquid to move into the valve. If the beam of light is then moved towards the second conduit, the beam can be followed by the liquid as the localized surface tension of the valve is changed. Once the light beam moves past the valve surface such that part of the valve is no longer illuminated. The localized valve surface will again become hydrophobic and will be closed. A volume of liquid can thus be taken-up from and broken away from the liquid in the first channel. Upon continued movement of the light beam followed by switching off the light, the remaining liquid in the valve can be moved into the second channel.

Figure 5:
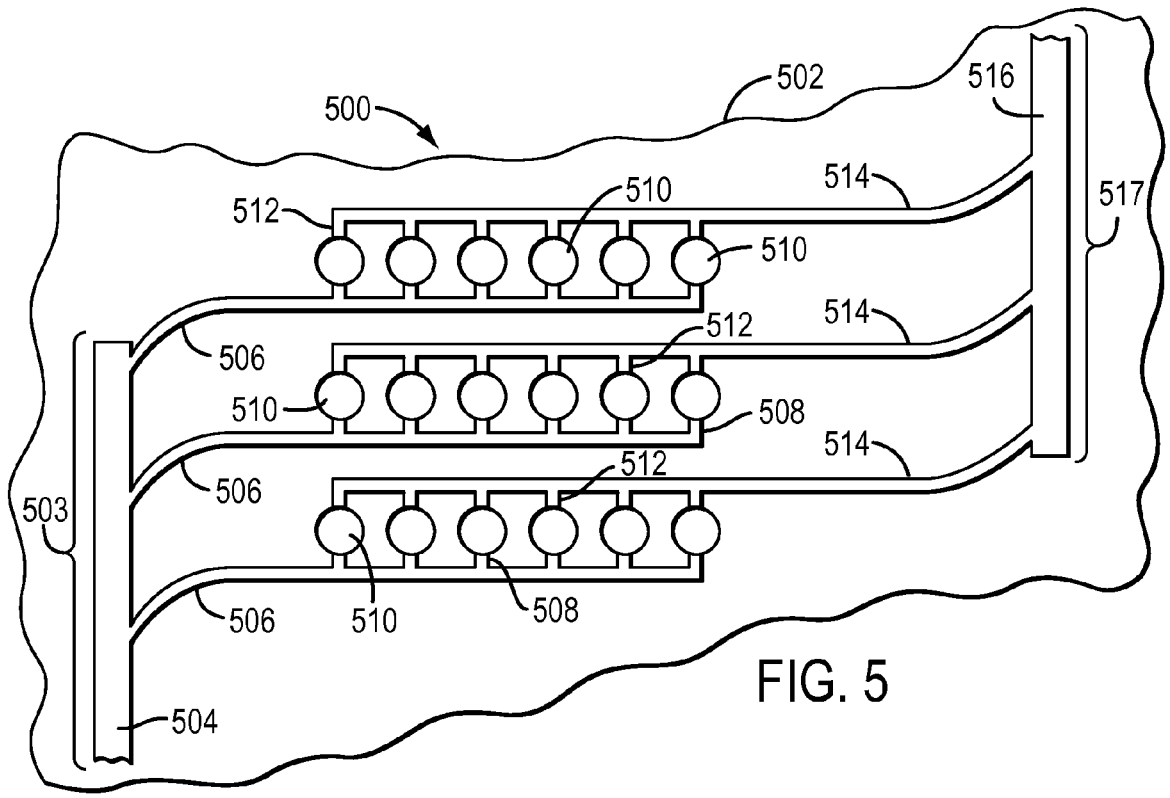
FIG. 5 is a top plan view of a portion of a fluid processing device according to various embodiments.

According to various embodiments, and as illustrated in FIG. 5, a fluid processing device 500 can comprise a first manifold 503 in fluid communication with a supply conduit 504. The first manifold 503 can be in fluid communication with several feeder conduits 506. A plurality of reaction sites 510 can be in fluid communication with a respective feeder channel 506. Surface tension control valves 508 can be disposed in one or more of the feeder channels 506 adjacent each reaction site 510. A second manifold 517 is in fluid communication with a conduit 516 and a plurality of feeder conduits 514. Each feeder conduit 514 is in fluid communication with a respective plurality of the reaction sites 510, for example, on opposite sides of the respective reaction regions relative to the respective feeder channels 506.

The fluid processing device 500 can be disposed in or upon a chip or card 502. The chip or card 502 can comprise glass, silicon, plastic, polycarbonate, polypropylene, polymers of cyclic olefins, copolymers, combinations thereof, and the like. The chip or card 502 can be molded with features and enclosed by one or more cover films or layers. The reaction regions 510 can be any suitable shape, for example, well-shaped.

The conduits and reaction sites can have any of a variety of dimensions. At least one feature can have at least one dimension of five mm or less, for example, one mm or less, or 500 microns or less. Conduit depths and widths can be equivalent or different from one another. Different channel aspect ratios can be used. According to various embodiments, channels can be dimensioned to permit manipulation of fluids by capillary action, and to promote or induce capillary fluid flow. The conduits can have various cross-sectional shapes, including, for example, a square cross-section, a rectangular cross-section, a circular cross-section, a U-shaped cross-section, a V-shaped cross-section, or a combination thereof.

If a conduit has an inner surface that contains both hydrophobic and hydrophilic portions, some additional force or pressure can be required to push the liquid through the hydrophobic part of the channel as compared movement through a hydrophilic portion of the same channel.

Figure 6:
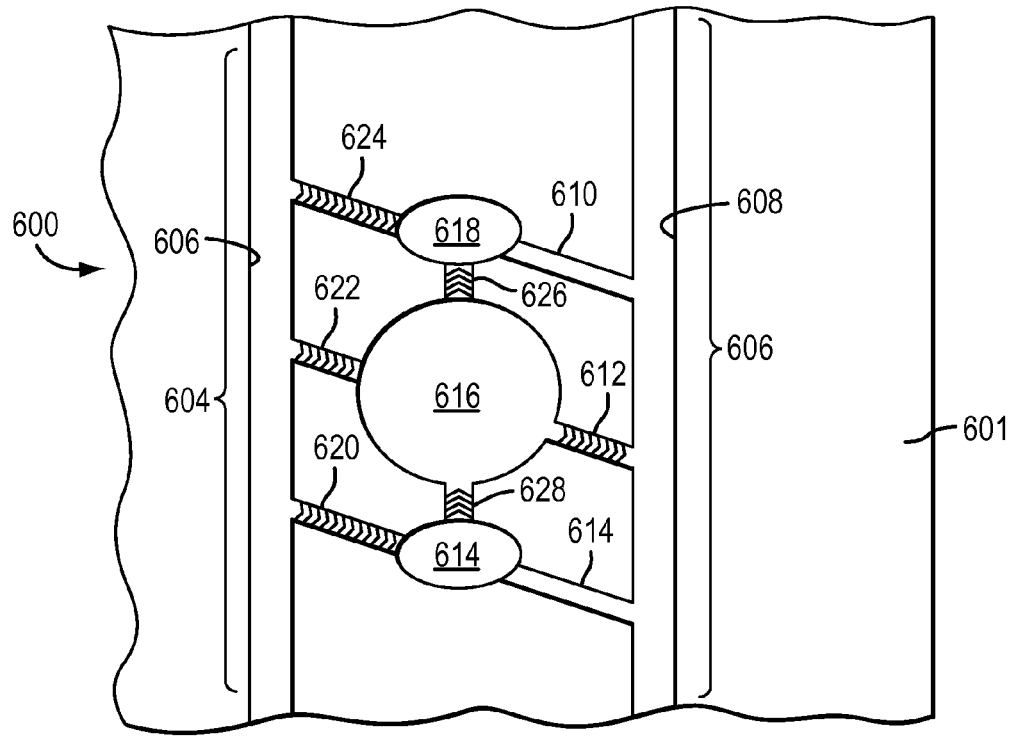
FIG. 6 is a top plan close-up view of a portion of a fluid processing device according to various embodiments.

According to various embodiments, and as illustrated in FIG. 6, a fluid processing device 600 can comprise a substrate 601, and a first manifold 604 including a main conduit 606 and several feeder conduits 620, 622, and 624, wherein each feeder conduit comprises a respective surface tension control valve. The feeder conduits 620, 622, 624 can be in fluid communication with reaction sites 614, 616, and 618, respectively. Reaction sites 616 and 618 can be fluidically connected to one another by a conduit 626 that comprises a surface tension control valve. The conduit 626 can be directly between the reaction sites 616 and 618. Similarly, reaction sites 614 and 616 can be fluidically connected by a conduit 628 having a surface tension control valve. Controlling the opening and closing of one or more of the surface tension control valves 620, 622, 624 can enable the selective production of a different oligomer in each respective reaction site 614, 616, 618. A second manifold 606 comprising a main conduit 608 and several feeder conduits 610, 612, 614 can be in fluid communication with the reaction sites 614, 616, 618, respectively. The second manifold 606 can be used to carry away reactants, non-reactive reaction components, and/or wash fluids, from the reaction regions. The second manifold 606 can alternatively, or additionally, be used to supply the reaction sites 614, 616, 618 with one or more reactants, non-reactive reaction components, and wash fluids. Through combinations of supply and wash steps and surface tension control valve opening and closing steps, different oligonucleotides can simultaneously be synthesized in the different reaction sites of the device, as described in more detail below.

Figure 7:
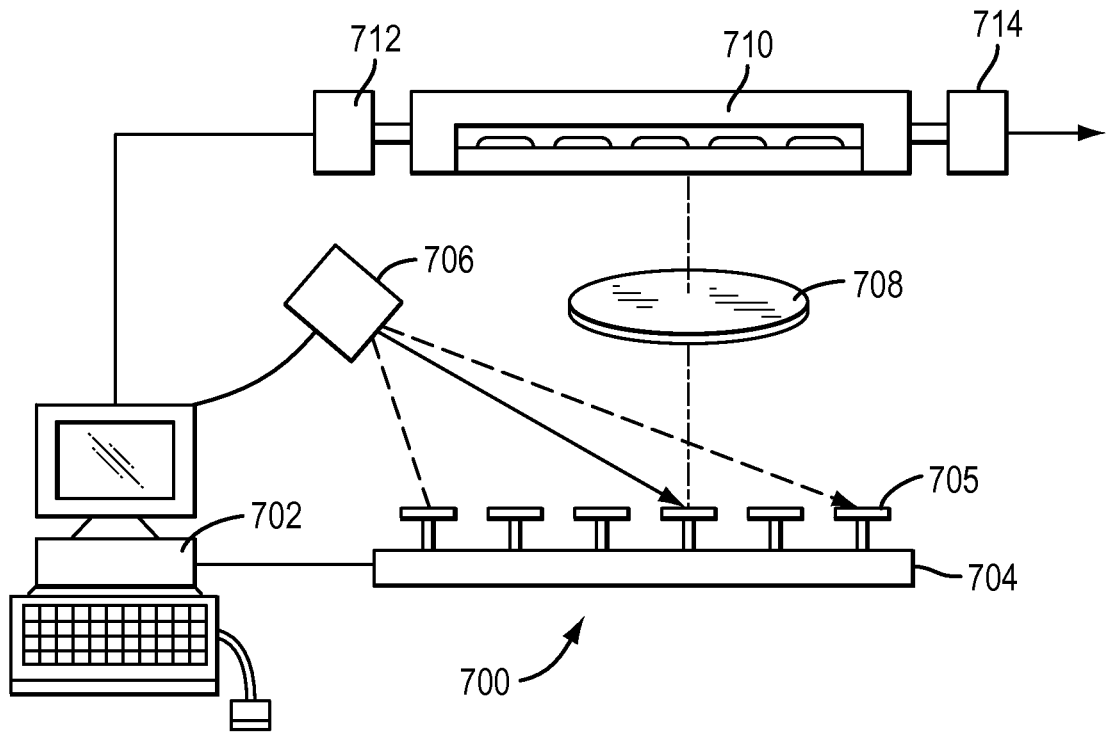
FIG. 7 is a perspective view of a system for processing a fluid processing device according to various embodiments.

According to various embodiments, and as illustrated in FIG. 7, a fluid processing system 700 can comprise a processing device, for example, a computer 702. The computer can be electrically connected, for example, through wires or through a wireless connection, to a suitable electromagnetic radiation source 706 that is capable of sufficiently illuminating a surface tension control valve to cause a change in the hydrophobic/hydrophilic properties of the valve. The electromagnetic radiation source 706 can comprise a laser, an ultraviolet light source, an infrared source, an incandescent bulb, a fluorescent bulb, a light-emitting diode (LED), an array of LEDs, combinations thereof, and the like.

According to various embodiments, the fluid processing system 700 can comprise an apparatus 704 for directing the electromagnetic radiation toward a plurality of separate surface tension control valves incorporated in a fluid processing device, for example, in a card or chip 710. The apparatus 704 can include an electromagnetic radiation reflective device such as one or more minors. The apparatus 704 can comprise a plurality of independently-moveable, computer controllable, micro-minors 705, as shown. The fluid processing system 700 can further comprise one or more lenses 708, for focusing the electromagnetic radiation reflected by the micro-mirrors 705 toward the fluid processing device 710. Pumps 712, and 714, can be fluidically connected to the fluid processing device 710, for example, to one or more manifolds in the device, and operatively connected to the computer 702. Operatively connected can be defined as electrically connected, mechanically connected, fluidically connected, combinations thereof, and the like. The pumps 712, 714, can be used to control, at least in-part, the flow of fluids to and/or from the fluid processing device 710.

Figure 8:
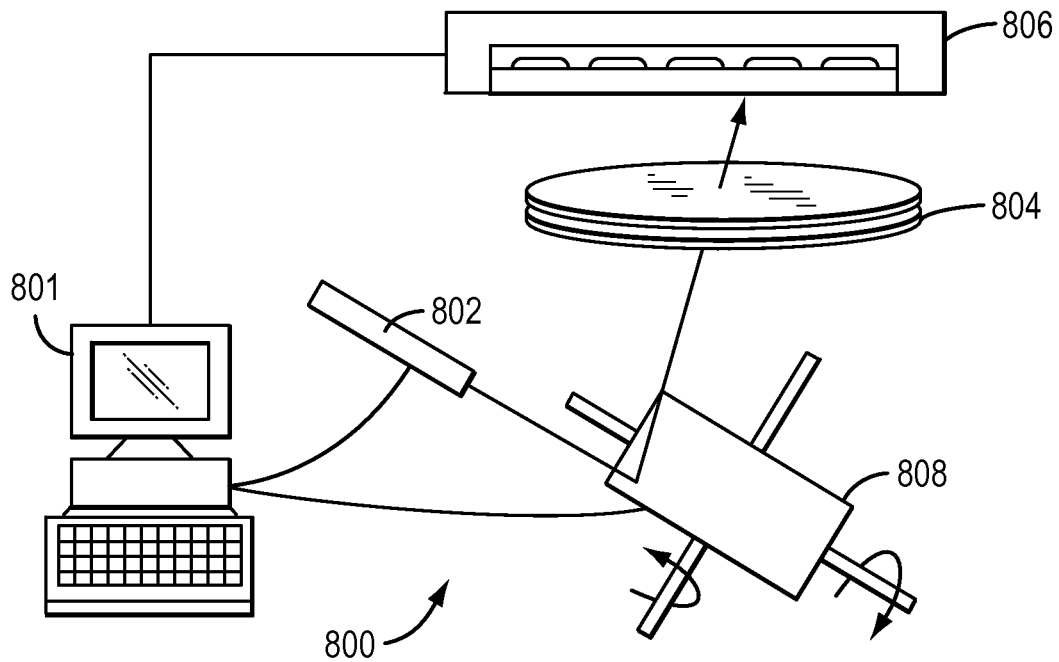
FIG. 8 is a perspective view of a system for processing a fluid processing device according to various embodiments.

According to various embodiments, and as illustrated in FIG. 8, a fluid processing system 800 is provided that can include a single mirror, for example, a galvo-mirror, controlled by a computer 801, to direct electromagnetic radiation from an electromagnetic radiation source 802 through one or more lenses 804 toward light-activated surface tension control vales in a fluid processing device 806.

Figure 9:
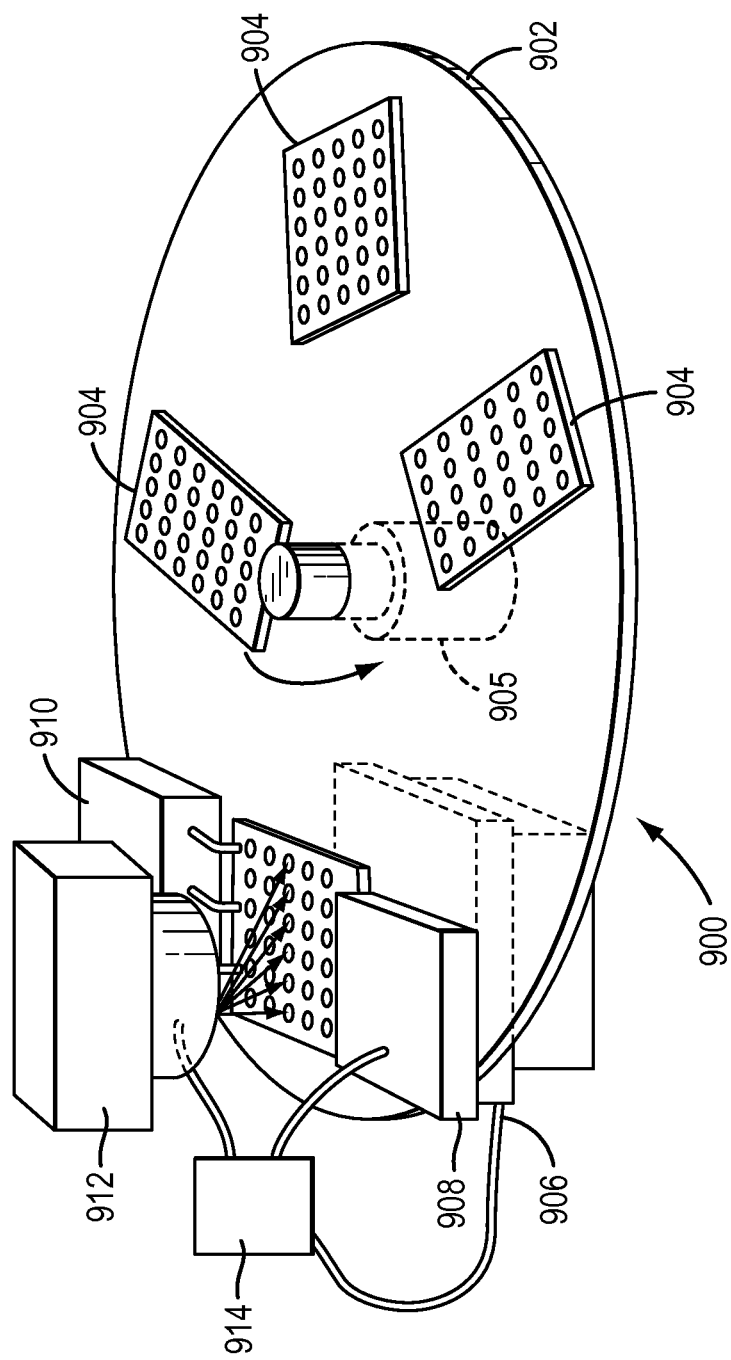
FIG. 9 is a perspective view of yet another system for processing a fluid processing device according to various embodiments.

According to various embodiments, and as illustrated in FIG. 9, a fluid processing system 900 can include a rotatable carousel 902 having a top surface. Disposed upon the top surface of the carousel 902 can be a plurality of fluid processing devices 904. Each device 904 can comprise a first manifold, a second manifold, a plurality of reaction regions, and a plurality of surface tension control valves, as described above. The carousel 902 can rotate so as to position each device 904 above a heater 906, and adjacent two or more pumps or pumping blocks 908, 910. The pumping blocks 908, 910 can be any suitable pumping devices for moving reagents, or can be pumping systems capable of independently addressing and pumping a number of different reagents present inside the block itself or in fluid communication with the blocks. Reagents that can be pumped into and out of the devices by the pumping blocks 908 and 910 can include nucleotides, nucleosides, nucleotide analogs, adenine, cytosine, guanine, thymine, uracil, protected versions thereof, deprotecting reagents, acids, capping reagents, wash fluids, or combinations thereof.

A detection block 912 comprising an electromagnetic radiation source and an imaging system can be disposed above the carousel 902. The detection block 912 can comprise an electromagnetic radiation source capable of selectively opening one or more surface tension control valves of an underlying device 904. The detection block 912 can also comprise an imaging system capable of recording images of, or viewing, tagged molecules, for example, fluorescently tagged molecules. The imaging system can include, for example, an analog camera, a film camera, a digital camera, a CCD, or a combination thereof. The fluid processing system 900 can include a drive unit 905 and a control unit 914. The control unit 914 can be operatively connected to the optical block 912, the pumping blocks 908, 910, the heater 906, the carousel 902, and/or the drive unit 905. Operatively connected can be defined as electrically connected, mechanically connected, fluidically connected, combinations thereof, and the like.

According to various embodiments, a method of synthesizing oligomers, for example, oligonucleotides, is provided for which traditional phosphoramidite chemistry can be used. The method can be used to create a plurality of identical oligomers in each reaction site or to create a different oligomer in each respective reaction site. The method can include providing a fluid processing device as described herein, for example, that includes one or more reaction sites each including an inner surface, a first manifold in fluid communication with the one or more reaction sites, a second manifold in fluid communication with the one or more reaction sites, and one or more surface tension control valves disposed in the first manifold.

The method can include introducing a first protected monomer into the first manifold, whereby the first protected monomer can be selectively introduced, through the one or more surface tension control valves, into the one or more reaction sites, depending upon how many surface tension control valves are activated to become open. The first protected monomer can then be attached to a structure or precursor in each reaction site, or can be attached directly to the inner surface of each reaction site. The attachment forms an extended structure. Excess first protected monomer can then be drawn out of the one or more reaction sites and through the second manifold, for example, by using a pumping block or device to create a negative pressure differential. At the same time, or subsequently, a wash fluid from the first manifold or second manifold can be forced into, or drawn through and away from, the one or more reaction sites that had the first protected monomer loaded therein. The wash fluid can be forced into or drawn through and away from the one or more reaction sites by a pumping block or pump connected to the first manifold, the second manifold, or both manifolds.

In a subsequent step, according to various embodiments, a deprotecting agent, for example, trichloroacetic acid, or the like, can be introduced into the first manifold and the one or more surface tension control valves can be opened, enabling the deprotecting agent to pass through and enter the one or more reaction sites. The deprotecting agent can be moved into the one or more reaction sites by using positive pressure, negative pressure, gravity, centrifugal force, capillary action, or the like. By contacting the first extended structure with the deprotecting agent in the one or more reaction sites, a deprotected extended structure can be formed in the one or more reaction sites. Excess deprotecting fluid can then be forced out or drawn out of the one or more reaction sites and through the second manifold, for example, by using a pumping block to create a negative pressure differential. At the same time, or subsequently, a wash fluid from the first manifold or second manifold can be forced into or drawn through and away from the one or more reaction sites that had the deprotecting agent loaded therein. The wash fluid can be forced into or drawn through and away from the one or more reaction sites by a pumping block or pump connected to the first manifold, the second manifold, or both manifolds.

The wash fluid can then be removed from the reaction site by a pumping block, by air pressure, by centrifugal force, or the like. According to various embodiments, the deprotecting agent and the wash fluid can be removed together from one or more of the reaction sites.

After removing the deprotecting agent, a second protected monomer can then be introduced from the first manifold, through the one or more surface tension control valves, and into one or more of the reaction sites. The second monomer can then bond to the deprotected extended structure, if present in the respective reaction site, to thereby form a second extended oligomer structure having at least two monomeric subunits.

The abovementioned method can be repeated multiple times until a desired oligomer has been formed. Once a completed oligomer has been formed, it can be cleaved from its attachment site in the reaction site and collected, for example, through the first or second manifold.

According to various embodiments of the method, and with reference to the device shown in FIG. 5, the first manifold 503 can be used for delivering reagents into the plurality of reaction sites, while the second manifold 517 can be used for drawing out or purging excess reagents from the reaction sites. Alternatively or additionally, the second manifold can be used to deliver reagents or wash fluid into one or more of the reaction sites 510. Each surface tension control valve can be controlled independently so a user can independently select whether a particular reagent is able to enter a reaction site from the first manifold 503. In this way, a different oligomer can be produced in each reaction site. In oligonucleotide synthesis, this selective synthesis can be accomplished by the selective introduction of monomers, deprotecting agent, washing fluid, or a combination thereof.

According to various embodiments of the method, the fluid processing device can be used to synthesize at least two different oligonucleotide primers and an oligonucleotide probe (as described above) in three different interconnected reaction regions, for example, in the three different reaction sites of the device shown in FIG. 6. In an exemplary embodiment, one primer can be formed in reaction site 614, a second primer can be formed in reaction site 618, and a probe can be formed or preloaded into reaction site 616. After formation of the primers, they can be cleaved from their respective reaction sites and combined into the reaction site 616 containing the probe. A nucleic acid sample can then be introduced into the reaction site 616 along with suitable reagents for a PCR reaction. The reaction site 616 can then be sealed with oil, a polymer, or with mechanical valving, to prevent evaporation, and then the contents of the site can be thermally cycled. In such embodiments, the device can be used for reagent synthesis and PCR using the reagent.

All references, patents, patent applications, and patent application publications cited herein are incorporated in their entireties by reference for all purposes.

Those skilled in the art can appreciate from the foregoing description that the present teachings can be implemented in a variety of forms. Therefore, while these teachings have been described in connection with embodiments thereof, the teachings should not be so limited. Various changes and modifications can be made without departing from the teachings herein.

What is claimed:

1. A method comprising:
   introducing a fluid including a first monomer into a first fluid distribution manifold of a fluid processing device;
   opening, by a controller, a closed surface tension control valve in fluid communication with both the first fluid distribution manifold and at least one respective reaction site, to form an open surface tension control valve, wherein opening the closed surface tension control valve allows flow of the fluid to contact the at least one respective reaction site,
   wherein the surface tension control valve is configured to be actuated by electromagnetic radiation directed at the surface tension control valve to change a contact angle of the fluid to a surface of the surface tension control valve,
   wherein the at least one closed surface tension control valve is disposed between the first manifold and the at least one respective reaction site, and
   wherein the open surface tension control valve is configured to allow the first monomer to move from the first manifold, through the open surface tension control valve, and into the at least one respective reaction site; and
   forming an extended structure by the first monomer attaching to a first structure in the at least one respective reaction site.

2. The method of claim 1, wherein in the extended structure, the first monomer is a first protected monomer, and the extended structure is a protected extended structure, and the method further comprises:
   washing the at least one respective reaction site subsequent to the attaching;
   closing the open surface tension control valve to form a closed surface tension control valve;
   introducing a deprotecting agent into the first manifold then opening the closed surface tension control valve to form a reopened surface tension control valve;
   moving the deprotecting agent from the first manifold, through the reopened surface tension control valve, and into the at least one respective reaction site; and
   deprotecting the protected extended structure to form a deprotected extended structure.

3. The method of claim 2, further comprising:
   introducing a wash reagent into a second manifold in fluid communication with the at least one respective reaction site;
   moving the wash reagent from the second manifold into the at least one respective reaction site; and
   removing the wash reagent from the at least one respective reaction site to form a washed and deprotected extended structure.

4. The method of claim 1, wherein the first structure is supported by a support and the method further comprises cleaving, with an introduced cleaving agent, the extended structure from the support to form a cleaved structure.

5. The method of claim 4, further comprising moving the cleaved structure from the at least one respective reaction site into a second reaction site that is in fluid communication with the at least one respective reaction site.

6. The method of claim 1, wherein the extended structure comprises a dimethyltrityl-protected phosphoramidite monomer.

7. The method of claim 1, wherein the surface tension control valve is configured to open in response to electromagnetic radiation directed toward the surface tension control valve.

8. The method of claim 1, wherein the surface tension control valve is configured to open in response to electromagnetic radiation emitted from an electromagnetic radiation source reflected toward the surface tension control valve.

9. The method of claim 8, wherein the electromagnetic radiation is reflected by individually controlled-movement of a plurality of mirrors.

10. The method of claim 1, wherein the surface tension control valve comprises a plurality of surface tension control valves, and the at least one respective reaction site comprises a plurality of respective reaction sites.

* * * * *